United States Patent
Chang et al.

(10) Patent No.: US 10,372,740 B2
(45) Date of Patent: Aug. 6, 2019

(54) VIEWPOINT DATA LOGGING FOR IMPROVED FEED RELEVANCE

(71) Applicant: Microsoft Technology Licensing, LLC, Redmond, WA (US)

(72) Inventors: Kevin Chang, Sunnyvale, CA (US); Lin Yang, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 15/454,136

(22) Filed: Mar. 9, 2017

(65) Prior Publication Data

US 2017/0262533 A1   Sep. 14, 2017

Related U.S. Application Data

(60) Provisional application No. 62/305,913, filed on Mar. 9, 2016.

(51) Int. Cl.
*G06F 16/30* (2019.01)
*G06F 16/335* (2019.01)
(Continued)

(52) U.S. Cl.
CPC .......... *G06F 16/335* (2019.01); *G06F 16/334* (2019.01); *G06F 16/9537* (2019.01);
(Continued)

(58) Field of Classification Search
CPC ....................................................... H04L 51/32
See application file for complete search history.

(56) References Cited

U.S. PATENT DOCUMENTS

2011/0238754 A1   9/2011   Dasilva et al.
2013/0031034 A1*  1/2013   Gubin .............. G06Q 10/06393
                                                706/12
(Continued)

FOREIGN PATENT DOCUMENTS

WO   WO-2012162816 A1   12/2012
WO   WO-2017156288 A1   9/2017

OTHER PUBLICATIONS

"International Application Serial No. PCT/US2017/021601, International Search Report dated May 8, 2017", 5 pgs.
"International Application Serial No. PCT/US2017/021601, Written Opinion dated May 8, 2017", 5 pgs.

*Primary Examiner* — Mahesh H Dwivedi
(74) *Attorney, Agent, or Firm* — Schwegman Lundberg & Woessner, P.A.

(57) ABSTRACT

A system and method includes obtaining activity data of an online social networking system, the activity data including duration data indicative of a duration in which at least some of the content items has previously been displayed on other feeds of members of the online social networking system and interactions with the content items by the members. For each of the content items, a probability score of the member to interact with the content item is determined by applying a logistic regression model to the duration data and the interactions to determine, at least in part, a probability score of the member to interact with the content item and the feed is generated with at least some of the content items having an order based on the probability score for each of the at least some content items.

19 Claims, 9 Drawing Sheets

(51) Int. Cl.
*G06F 16/33* (2019.01)
*G06Q 10/10* (2012.01)
*G06Q 50/00* (2012.01)
*H04L 12/58* (2006.01)
*H04L 12/46* (2006.01)
*G06F 16/9537* (2019.01)
*H04L 29/08* (2006.01)

(52) U.S. Cl.
CPC ......... *G06Q 10/1053* (2013.01); *G06Q 50/01* (2013.01); *H04L 12/4625* (2013.01); *H04L 51/32* (2013.01); *H04L 67/306* (2013.01)

(56) References Cited

U.S. PATENT DOCUMENTS

| | | | |
|---|---|---|---|
| 2014/0019443 A1 | 1/2014 | Golshan | |
| 2014/0039875 A1* | 2/2014 | Hao | G06F 17/27 |
| | | | 704/9 |
| 2014/0244621 A1 | 8/2014 | Lindsay | |
| 2015/0081449 A1* | 3/2015 | Ge | G06F 17/30867 |
| | | | 705/14.66 |
| 2016/0036887 A1* | 2/2016 | Ilic | H04L 51/32 |
| | | | 709/206 |
| 2016/0134577 A1* | 5/2016 | Owens | H04L 51/32 |
| | | | 709/206 |
| 2017/0171139 A1* | 6/2017 | Marra | H04L 51/32 |
| 2018/0027083 A1* | 1/2018 | Fadeev | H04L 67/22 |
| | | | 709/203 |

* cited by examiner

VIEWPOINT DATA LOGGING FOR IMPROVED FEED RELEVANCE

CROSS-REFERENCE TO RELATED APPLICATIONS

This international application claims the benefit of priority to U.S. provisional application No. 62/305,913 filed Mar. 9, 2016, entitled "VIEWPOINT FEED TRACKING FOR IMPROVED FEED RELEVANCE," the entire contents of which is hereby incorporated by reference herein in its entirety.

TECHNICAL FIELD

The subject matter disclosed herein generally relates to viewpoint tracking of content items in a feed of an online social networking system.

BACKGROUND

Online social networking systems conventionally obtain content items for display to members and other users of the online social networking system. Such content items may include comments or statements by members, shared articles from third-party websites, event notifications, and the like. The display of content items may be in a variety of formats, including as a "feed" in which content items are sequentially displayed to the user as the user scrolls through the feed, viewing and potentially interacting with the content items in turn.

BRIEF DESCRIPTION OF THE DRAWINGS

Some embodiments are illustrated by way of example and not limitation in the figures of the accompanying drawings.

DETAILED DESCRIPTION

Figure 1:
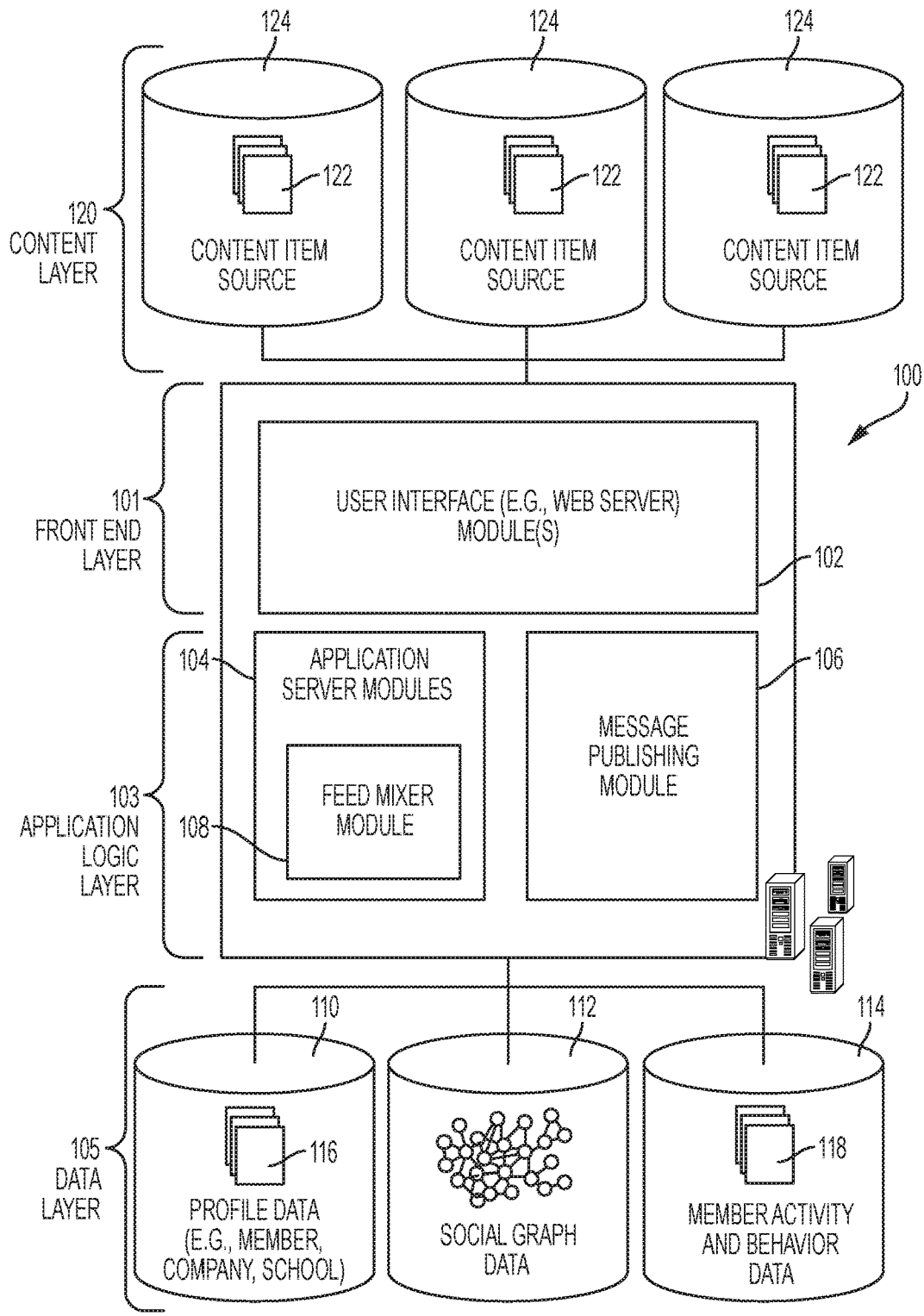
FIG. 1 is a block diagram illustrating various components or functional modules of an online social networking system, consistent with some examples.

Example methods and systems are directed to viewpoint tracking of content items in a feed of an online social networking system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The use of job postings in online social networking systems may tend to create problems of scale which are not encountered in past, conventional job posting circumstances. Where conventional job postings in newspapers, periodicals, and even on conventional websites may generate hundreds or in unusual circumstances even thousands of applicants, social networking systems may routinely generate thousands of applicants with various job postings resulting in far more than that. Moreover, because social networking systems conventionally include relatively rich, private profile information about members of the social networking system, such members may be enabled to interact with job postings in a way that does not necessarily extend to a full application for the job. For instance, the social networking systems may encourage members to review job postings and assess their qualifications for a job posting simply based on their profile information in a way that might quickly determine if basic qualifications are met and an estimate of what the member's changes of success might be if the member applied for the job.

Total user traffic and engagement with an online social networking system may be dependent to a significant degree on the quality of the feed on which content items are displayed. Users who are presented with fresh and relevant content items may tend to visit the online social networking system relatively frequently and interact with the content items and members of the online social networking system more than users who are presented with less relevant and/or repetitive content items. Thus, online social networking sites may desirably prevent users from being shown content items that are irrelevant to the user or content items that have previously been shown to the user.

However, simply because a content item was served to a user does not mean that the user actually meaningfully viewed the content item. To simply consider a content item that had been served to a user as having been "viewed" ignores situations where the user may be rapidly skimming a feed or may be distracted, e.g., because the user left an application providing the online social networking system idle. As such, conventional mechanisms for determining that a content item has been "viewed" by a user, e.g., because the content item was served to the user's online social networking system application, may not provide an accurate determination as to whether or not the user actually viewed the content item.

Accurate tracking of views and user actions is useful in modeling for search/recommendation engines in online social networking systems. Disclosed herein is a new mechanism of tracking data on a feed for displaying content items—viewport tracking (VPT). In contrast with conventional server-side tracking, VPT tracks what is actually rendered within a client's viewport. e.g., a browser window for desktop, application screen for phone/tablet, etc., rather than what is served to the user's computing device. Furthermore, in various examples, VPT augments each impression with information such as time of entering viewport and duration of stay with viewport.

VPT may improve the relevance to the viewer of content items displayed in a feed. Under the framework of an examination model, duration information from VPT data may be used to infer a probability of examination by the member for a given content item which is viewed. Offline replay and online A/B tests may provide metrics with statistical significance for calibration and fine tuning of the principles disclosed herein. The improved accuracy in displaying content items to members enables better performance for content item discounting to ensure a quality overall composition of the feed by demoting or deemphasizing content items which the viewer has seen before.

FIG. 1 is a block diagram illustrating various components or functional modules of an online social networking system 100, consistent with some examples. A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network system 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104. In some examples, the social network system 100 includes a content item publishing module 106, such as may be utilized to receive content, such as electronic messages, posts, links, images, videos, and the like, and publish the content to the social network.

One or more of the application server modules 104, the content item publishing module 106, or the social network system 100 generally may include a feed mixer 108. As will be disclosed in detail herein, the feed mixer 108 may allow for content items from multiple content item sources to be combined into a single feed for transmission to and/or display on a user interface of a member or user of the social network.

The feed mixer 108 may be implemented on a separate server or may be part of a server that provides other portions of the social network system 100. Thus, it is to be understood that while the feed mixer 108 is described as an integral component of a social network, the principles described herein may be applied without the feed mixer 108 being an integral part of a social network or even necessarily utilizing data from a social network if content items 122 are available from alternative sources.

As illustrated, the data layer 105 includes, but is not necessarily limited to, several databases 110, 112, 114, such as a database 110 for storing profile data 116, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

Activities by users of the social network system 100, including past searches that have been conducted by the feed mixer 108, may be logged as activities 118 in the activity and behavior database 114. Such activities may include search terms, interactions with search results and subsequent engagement with the subject of search results, scores assigned to such search terms, as disclosed herein, communication with others via the social network, engagement with content items posted on the social network, joining groups, following entities, and so forth. Profile data 116, activities 118, and the social graph of a member may collectively be considered characteristics of the member and may be utilized separately or collectively as disclosed herein.

The data layer 105 collectively may be considered a content item database, in that content items, including but not limited to member profiles 116, may be stored therein. Additionally or alternatively, a content item layer 120 may exist in addition to the data layer 105 or may include the data layer 105. The content item layer 120 may include individual content items 122 stored on individual content item sources 124. The member profiles 116 and the activities 118 may be understood to be content items 122, while the profile database 110, the social graph database 112, and the member activity database 114 may also be understood to be content item sources 124. Content items 122 may further include sponsored content items as well as posts to a news feed, articles or links to websites, images, sounds, event notifications and reminders, recommendations to users of the social network for jobs or entities to follow within the social network, and so forth.

The social network system 100 may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social network system 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
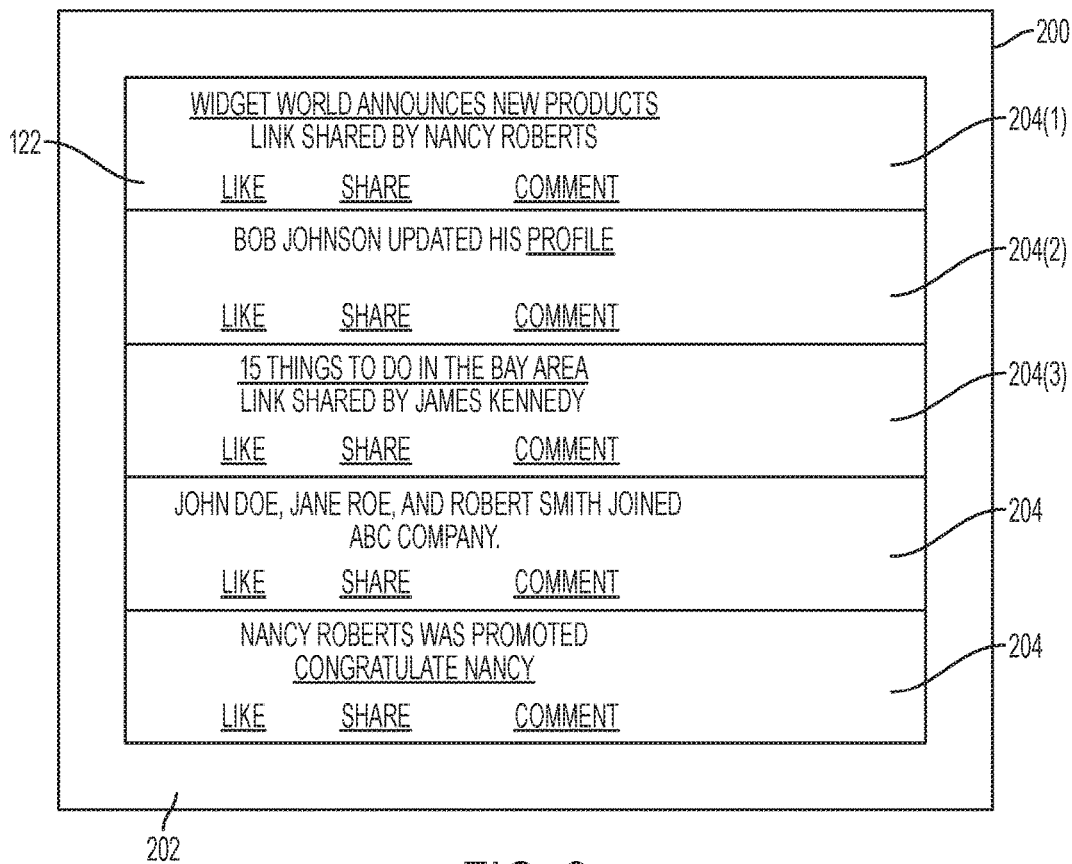
FIG. 2 is a simplified depictions of a user interface as provided by a social network system, in an example embodiment.

FIG. 2 is a simplified depictions of a user interface 200 as provided by the social network system 100, in an example embodiment. The user interface 200 includes a feed 202 that includes multiple individual positions 204 arranged, in this example, in a vertical list with a first position 204(1) at the top and lower positions sequentially down the list. Each position 204 includes space to display content related to the content item 122; in various examples, the content item 122 itself may be displayed, for instance if the content item 122 is a link or a renderable image, or data relating to the content item 122 may be displayed, such as if the content item 122 needs to be reformatted for the user interface 200 or the circumstances in which the user interface 200 is being displayed. It is to be recognized that the user interface 200 is provided for the purposes of an example and that many additional configurations of user interfaces 200 are contemplated and may be utilized consistent with the principles described herein.

The feed 202 itself may include, and in various examples does include, more content items 122 than are visible within the user interface 200 at any given time. By scrolling down the feed 202, individual content items 122 may become visible to a viewer or may scroll off the user interface 200, thereby becoming non-visible. As disclosed herein, the user interface 200 or related client system may track when content items 122 of the feed 202 are visible to a viewer.

The feed 202 may function as a user interface portal to various resources the social networking system 100 may provide. When users come to the feed 202, they may see a stream of content items 122 that function as updates from their connections (e.g., someone has had a work anniversary, updated their profile, shared an article, etc.) as well as from the social networking system's 100 own services (e.g., recommendations for people the user may know or jobs the user may be interested in, etc.). A user may have a relatively large volume of updates and content items 122 in general in their feed 202, but only a limited amount of time to consume such content. To provide delivery of meaningful content to users, the social networking system 100 incorporates a personalized feed 202 which may present the most relevant content items 122 to a user while keeping the feed 202 fresh and diverse.

Figure 3:
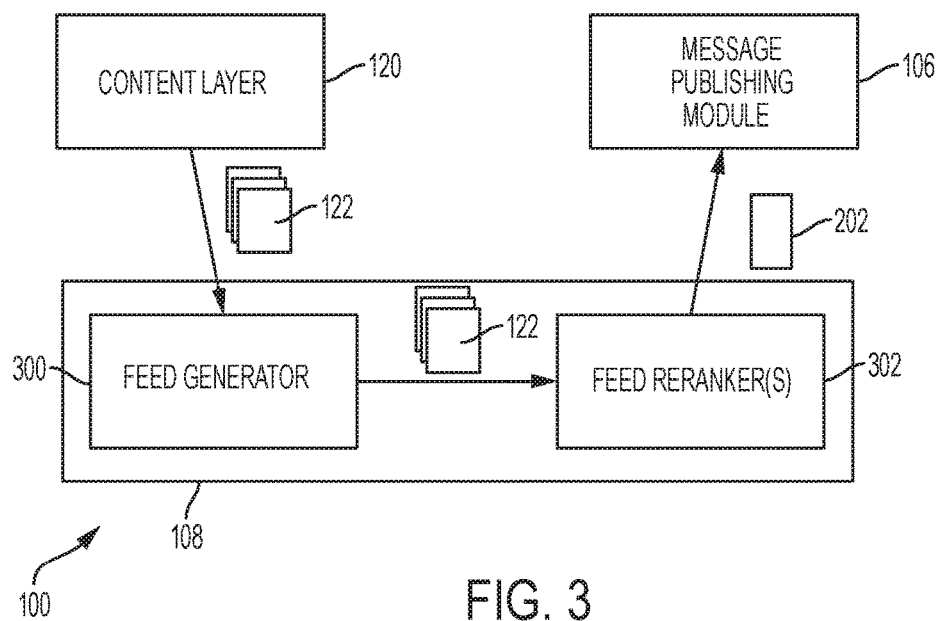
FIG. 3 is a block diagram of subsystems of an online social network system, including a feed mixer, in an example embodiment.

FIG. 3 is a block diagram of subsystems of the online social network system 100, including the feed mixer 108, in an example embodiment. The feed mixer 108 includes a feed generator 300 and one or more feed rerankers 302. The feed generator 300 variously receives, from the content layer 120, pushed content items 122 and/or metadata of content items 122 or retrieves content items 122 and/or metadata of content items 122. The feed generator 300 creates an interim feed as disclosed herein and then passes the interim feed to the feed reranker(s) 302 to select the content items of the feed 202. As illustrated, the content items 122 of the feed 202 are sent to the message publishing module 106 to be formatted for display, though in alternative examples the content items 122 may previously have been sent to and published by the message publishing module 106 and may not need to be so sent again before being output via the user interface module 102.

The feed generator 300 includes or otherwise implements a logistic regression model to generate the interim feed. In an example, the content items 122 are characterized by an actor-verb-object triplet, referred herein as "activityType". For example, a content item 122 may be defined as "Bob (actor) shared (verb) article 1234 (object)." Given a member and a content item 122, the regression model pulls profile features capturing commonality between the member profile and the content item 122 actor (e.g., education, location, work experience, etc.) as well as affinity features capturing past interactions (e.g., clicks) between the member and the actor and view-activityType pairs, etc. Based on multiple features, and in certain circumstances thousands of features, the social networking system 100 computes a probability of the member engaging with the update, as disclosed herein, and produces an initial ranking of updates according to probability scores. In an example, the ranking is further refined by a set of rerankers of the social network system 100 which may provide a good overall composition of content items 122 in the feed 202. In an example, reranking may improve freshness and diversity by demoting content items 122 that are old, that share the same actor/object as previous content items 122, or have been viewed on the feed by the member multiple times.

Data from the activity and behavior database 114 may be utilized for both the logistic regression model and the rerankers. The social network system 100 may rely on activities 118 in the recent past to collect a training dataset. Feed 202 impressions with user engagement (e.g., a click of a link, a "like", a comment, or a "share", among other engagement operations known in online social networking systems) may, in an example, be labeled as positive activities; views without any user engagement may be labeled as negative examples. In the rerankers, activities 118 may indicate how many times a content item 122 has been viewed by a user in the past, and discount its probability score accordingly.

In previous examples of online social networking systems, content items 122 displayed on the feed 202 are tracked on the server side. After a frontend server sends a page of k content items 122 to a client (e.g., to a desktop or phone/tablet), the frontend server logs the k updates as impressions. However, depending on the user interface screen size, only a subset of the content items 122 may be viewed at a time. Unless the user scrolls to the end of the feed 202, the tracking data logged by the frontend server may contain false impressions, as some of the content items 122 may not have been seen by the user. False impressions may cause degradation to the feed generator 300 logistic regression model and rerankers 302 as such false impressions may add noise to negative interactions and may penalize content items 122 which have already been seen by the member (e.g., by ranking such updates lower), and potentially exclude such content items 122 from future results.

In various examples, the user interface module 102 implements viewport tracking (VPT) to resolve or substantially mitigate the issue of false impressions. In an example, the user interface module 102 implements the VPT logic on the client side, i.e., on the user device of the user to whom the feed 202 is to be presented. Instead of tracking what is sent to a client, VPT tracks what is actually rendered or otherwise displayed within a client's user interface 200, thereby effectively removing false impressions. For true impressions, VPT can also augment tracking data with additional information, such as time a content item 122 enters or otherwise is displayed on the user interface 200 and a duration during which the content item 122 is visible on the user interface, etc., which may not attainable from server-side tracking.

In an example, different types of content items 122 displayed on the feed 202 exhibit different layouts and may therefore lead to different user behavior. Some content items 122 (e.g., a user changing profile picture) may have almost all the information displayed in the feed 200 and thus require no click or other interaction to consume the information, while other types of content items 122 (e.g., an article) do not offer much value unless users click a link to view more details. As will be disclosed herein, empirical data of engagement with updates in the feed 202 show a large spread of VPT statistics among different types of content items 122 displayed in the feed 202. As will be disclosed herein, the social network system 100 utilizes VPT to improve the identification of relevant content items 122 for a given user.

Figure 4:
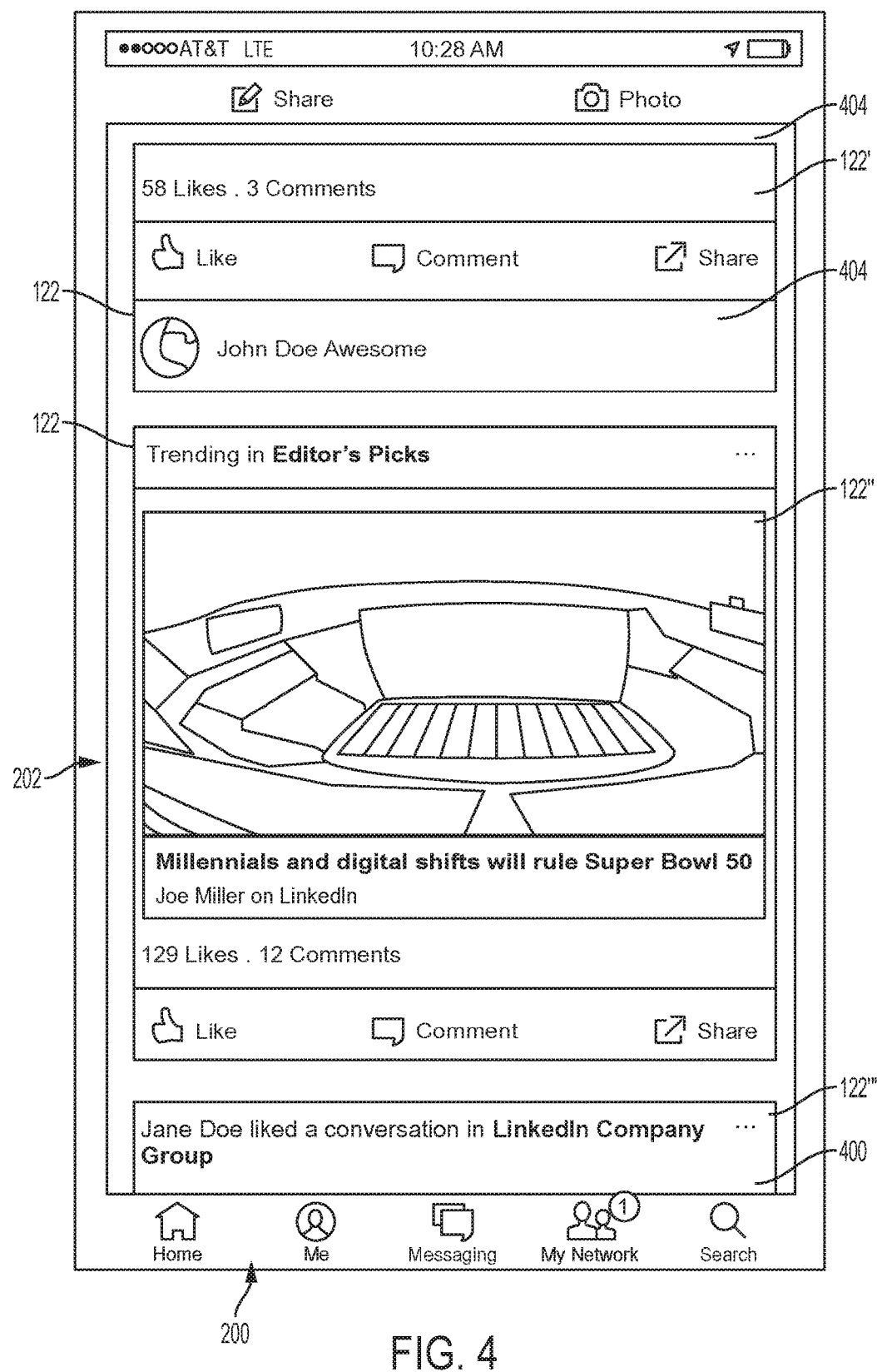
FIG. 4 is an illustration of content items on a feed displayed on a user interface, in an example embodiment.

FIG. 4 is an illustration of content items 122 on a feed 202 displayed on a user interface 200, in an example embodiment. A disclosed herein, VPT tracks what is rendered within a user interface 200 (e.g., a browser window for desktop, an app screen for phone/tablet, etc. It is noted that the illustration of FIG. 4 is specifically with respect to a screen on a mobile device such as a smartphone.). In a conventional orientation, a user moves through the feed 202 by causing the feed 202 to scroll up from a bottom 400 of the user interface 200 to a top 402 of the user interface, e.g., by running a finger from bottom 400 to top 402 of the screen on the illustrated touchscreen implementation or by scrolling a mouse, among any of a variety of mechanisms.

As illustrated, the content items 122 are in various display configurations, having various entered and exited the user interface 200. For instance, the content item 122' is partially off the top 402 of the user interface 200, having scrolled partially off the user interface 200 after having been wholly displayed on the user interface 200 previously. As such, the content item 122' only displays a bottom portion 404 of the content item 122', but a user could restore the entire content item 122' to the user interface 200 by scrolling the feed 202 back down. However, as disclosed herein, the content item 122' may have been deemed to have previously been displayed on the user interface 200, counting as a VPT-qualifying event (provided, in various examples, that the content item 122' was displayed for a sufficiently long duration, as disclosed herein).

The content item 122" is wholly displayed on the user interface 200 and is a VPT-qualifying event (again, in various examples provided that the content item 122" has been on the user interface 200 for a sufficient duration). With respect to the content item 122''', an insufficient percentage of the content item 122" has been displayed on the user interface 200 to be a VPT-qualifying event. However, if the user further causes the feed 202 to scroll up across the user interface 200 so as to display a sufficient percentage of the content item 122''', as disclosed herein, the display of the content item 122''' may be a VPT-qualifying event.

After a content item 122 enters and exits the user interface 200, an event is generated with a unique ID associated with the content item 122 along with metadata (e.g., the time of entering the user interface 200 and a duration of the time displayed on the user interface 200). The unique ID and the metatdata are joined with server side tracking data, e.g., as provided by the user interface module 102, to annotate for each content item 122 sent from the online social networking system, if/when the update was displayed in the user interface 200.

Figure 5:
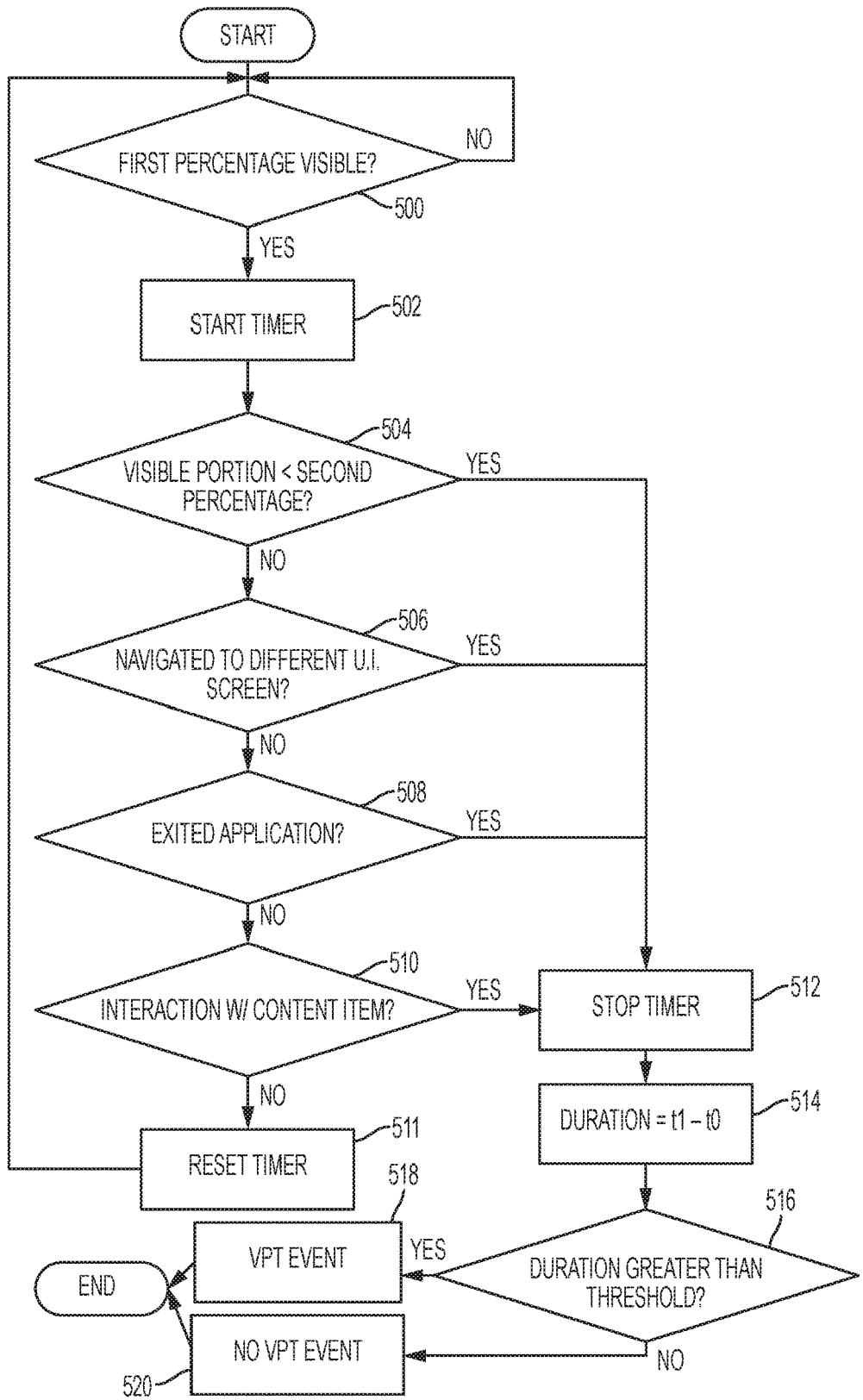
FIG. 5 is a flowchart for identifying a VPT-qualifying event, in an example embodiment.

FIG. 5 is a flowchart for identifying a VPT-qualifying event, in an example embodiment. As noted, VPT may operate on the client side. i.e., at the user device on which the user interface 200 is displayed. As such, VPT may be operated by a processor of the user device. However, it is noted that the user device may simply collect information related to VPT and transmit the information related to VPT to the online social networking system 100 where the user interface module 102 or other component of the online social networking system 100 may perform the operations described in the flowchart. It is emphasized that the below example includes various example values for conditions (e.g., fifty (50) percent), but that any suitable value may be implemented herein.

At 500, the processor determines if a first percentage, e.g., fifty (50) percent, of a content item 122 becomes visible in the user interface 200.

At 502, a timer is started at t0 to track the content item 122.

At 504, the processor determines if the portion of the content item 122 visible on the user interface 200 drops below a second percentage, e.g., fifty (50) percent. If so, the processor proceeds to stop the timer at 512. If not, the processor proceeds to 506.

At 506, the processor determines if the user has navigated to a different screen on the user interface 200 and, as such, the view of the feed 202 is terminated altogether. If so, the processor proceeds to stop the timer at 512. If not, the processor proceeds to 508.

At 508, the processor determines if the user has exited the application running the user interface 200 or has placed the application in the background and is not actively viewing the application. If so, the processor proceeds to stop the timer at 512. If not, the processor proceeds to 510.

At 510, the processor determines if the user has interacted with the content item 122 (e.g., by clicking a link, "liking", commenting, or sharing the content item, etc.). If so, the processor proceeds to stop the timer at 512. If not, the processor proceeds to 511.

At 511, the processor resets the clock and proceeds back to 500.

At 512, the processor stops the clock at time t1.

At 514, the processor determines the duration of stay for the content item on the user interface 200 as t1−t0.

At 516, the processor determines if the duration is great than a specified minimum or threshold duration, e.g., three hundred (300) milliseconds. If so, the processor proceeds to 518. If not, the processor proceeds to 520.

At 518, the processor determines that the viewer has viewed or otherwise sufficiently interacted with the content item 122 that a VPT event has occurred and proceeds as disclosed herein.

At 520, the processor determines that the viewer has not viewed or otherwise sufficiently interacted with the content item 122 that a VPT event has not occurred and proceeds as disclosed herein.

In various examples, the minimum threshold value three hundred (300) milliseconds has been empirically found to be able to eliminate a substantial portion of fast-scroll impressions while preserving almost all true impressions. However, in various other circumstances alternative thresholds may be applicable or preferable. Thus, in various examples, the threshold may be modified when consuming the data to remove more short impressions.

Figure 6:
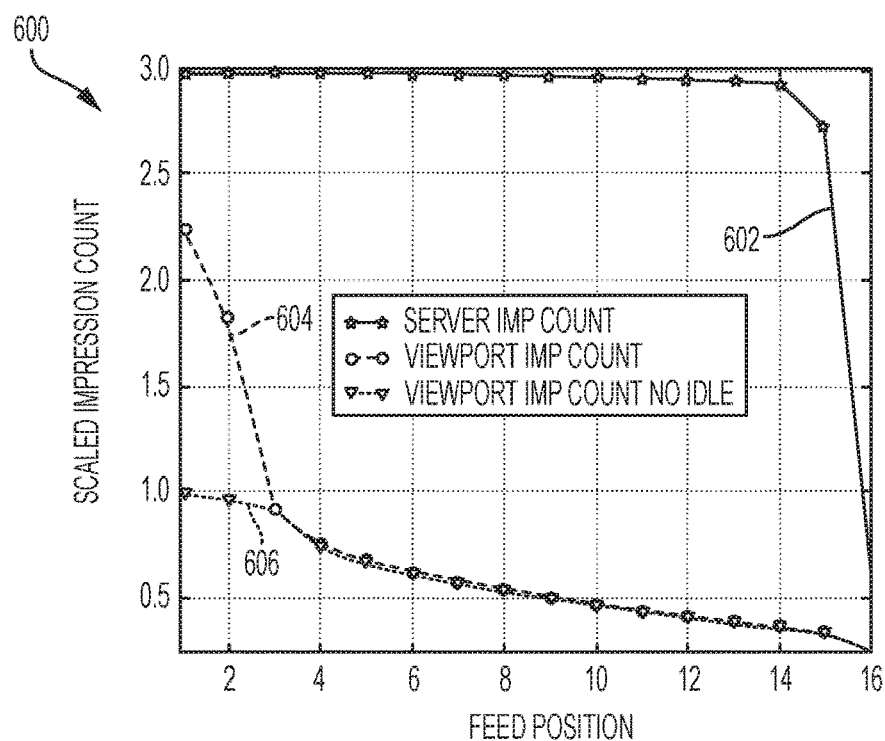
FIG. 6 shows a graph of impressions for content items by feed position, in an example empirical implementation.

FIG. 6 shows a graph 600 of impressions for content items 122 by feed position 204, in an example empirical implementation. The graph 600 covers up to the sixteenth position 204 in the feed 202 in an example implementation of the online social networking system 100 in which a page of fifteen (15) content items 122 are served to the feed 202. A first curve 602 illustrates apparent impressions from the server-side, which shows near-flat impressions all the way through position 204 fifteen (15), because the server logs an entire page of k=15 updates as impressions when the page is requested. Then there is a sharp drop at position 204 sixteen (16), which indicates that a majority of users do not scroll to the end of the first page, and thus a second page is not requested.

By contrast, a second curve 604 corresponding to client-side VPT shows monotonically decreasing impressions through all feed positions 204. It shows that the drop across page boundary (in the current example, between position 204 fifteen (15) and sixteen (16)) is as small as between in-page positions. In an example of the user interface 200, the feed 202 shows an effectively endless stream of updates as long as the user continues to scroll through the feed 202. Therefore, it may be inferred from the data that, in the example environment, little or no behavioral change from users occurs when the users scroll across page boundaries.

One unexpected result with VPT comes from the second curve 604 showing a large drop of impressions through the first three (3) positions 204 in the feed 202. Empirical analysis suggests that idle sessions in which users loaded a feed 202 but had no or effectively no interaction with the feed 202 (e.g., no scrolling or clicking) cause the first three positions 204 to be displayed on the user interface 200 without the user actually interacting or even particularly perceiving the content items 122 displayed. This lack of interaction may correspond to cases where users simply pass through a homepage of the online social networking system 100 on their way to some other function of the online social networking system 100. Depending on the size of user interface 200 and content items 122, approximately three (3) content items 122 may be displayed on the user interface 200 in an initial load of the feed 202 on the user interface 200. Therefore, idle sessions may tend to boost impression counts at the first several positions 204. In an example, removing sessions with two (2) or fewer viewport impressions and no interaction with any content item 122 provides VPT data having smooth impression counts across all positions of the feed, as illustrated by curve 606.

In various examples, if multiple events were generated for the same content item 122 due to the content item 122 entering and exiting viewport multiple times, the duration time from its first impression may be utilized for analysis. However, any of a variety of criteria for duration time may be utilized.

Figure 7:
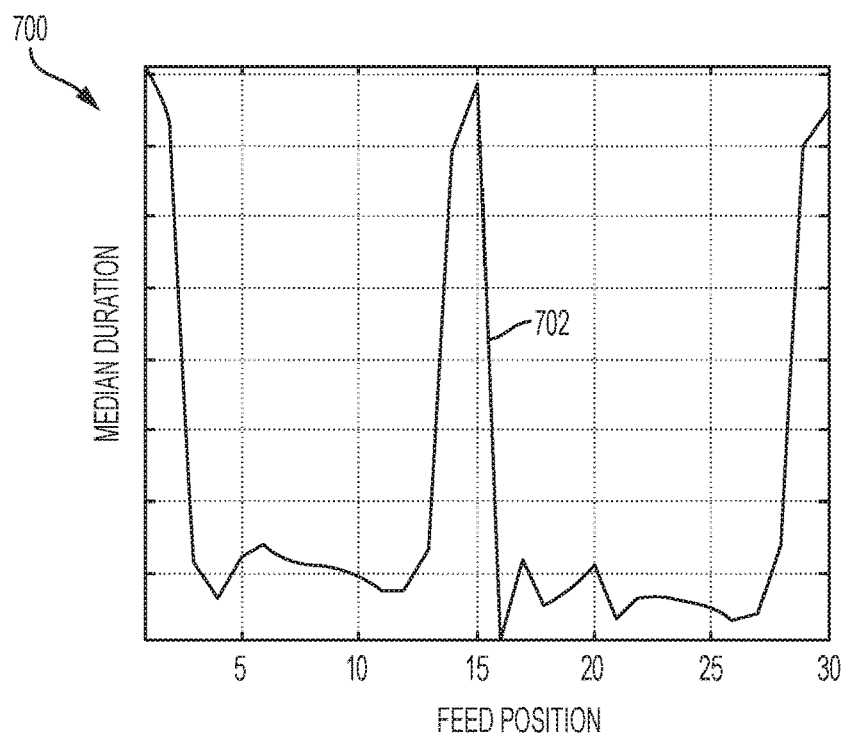
FIG. 7 is a graph of median duration of the display on the user interface of content items at each position, in an illustrative empirical example.

FIG. 7 is a graph 700 of median duration of the display on the user interface 200 of content items 122 at each position 204, in an illustrative empirical example. A strong pattern of duration time peaking near page boundaries is apparent from the curve 702. The first content item 122 of a first page, and last two (2) content items 122 of each page, have a higher median duration than other feed positions 204. Relevance of the content items 122 to the user may have little apparent impact on the pattern of curve 702, as data for the graph 700 may be obtained from a randomized presentation of content items 122 in the feed 202. Rather, in various examples, the pattern of the curve 702 may be caused by latency of network communication. At the end of each page, a client sends a request to the online social networking system 100 for more content items 122, i.e., a new page. The wait time for server response may artificially boost duration time for the few content items 122 remaining on the user interface 200 until the new page is served to the client.

Figure 8:
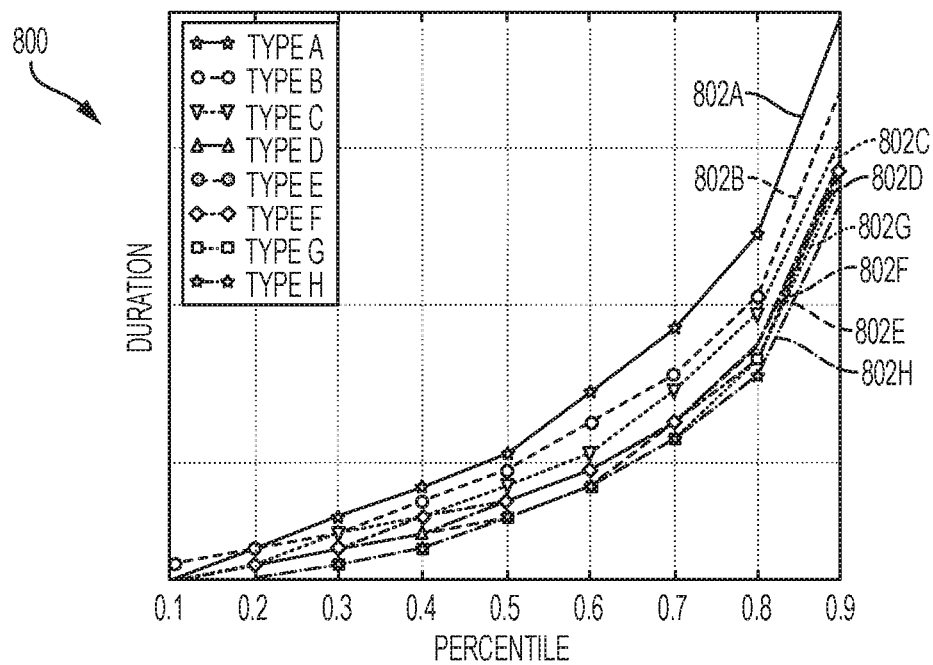
FIG. 8 is a graph depicting the distribution of duration time by content item object type, in an illustrative empirical example.

FIG. 8 is a graph 800 depicting the distribution of duration time by content item 122 object type, in an illustrative empirical example. The curves 802A, 802B, 802C, et seq., suggest that relatively less complex objects correspond to longer durations. Object types with shortest duration (type H) have relatively more content, usually showing long text with a title and summary, while object types with longest duration (types A, B and C) usually have a relatively simple layout with comparatively short text.

It is further noted that types A and B also have the highest click-through rate (CTR) of the content item 122 types. Therefore, one hypothesis is that duration time reflects more on a content item's 122 relevance than the content item's 122 complexity. Given a simple but relevant content item 122, a user may spend more time examining its details. Alternatively, given a complex but irrelevant content item 122, a user may stop looking very quickly and move on to other content items 122 in the feed 202.

Figure 9:
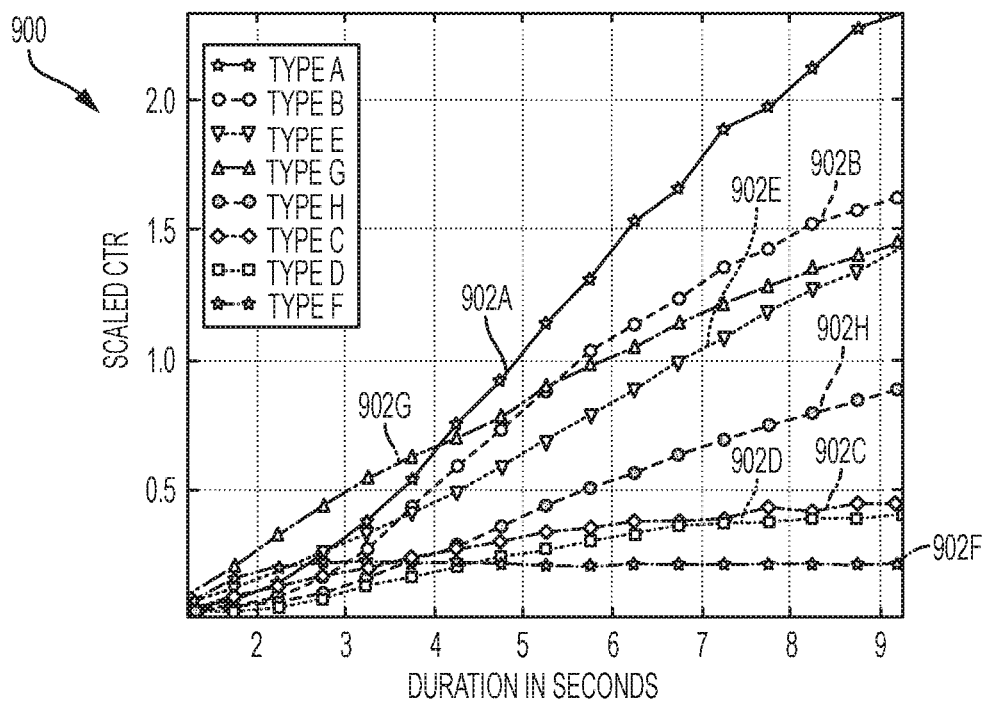
FIG. 9 is a graph illustrating a rate of user engagement, such as a click-through rate (CTR), for different object types, in an illustrative is illustrated.

FIG. 9 is a graph 900 illustrating a rate of user engagement, such as a click-through rate (CTR), for different object types, in an illustrative is illustrated. The duration axis is divided into 0.5-second buckets. Each VPT event is assigned to a bucket according to the duration of the event, and CTR for each bucket is computed. In the illustrated example, CTR shows positive correlation with duration time for all object types, though it is emphasized that alternative examples may not necessarily show such positive correlation.

The results above show that duration information may carry a useful indication of the relevance of a content item 122 to a user. In examples of online social network systems not incorporating VPT, all impressions with user engagement may be deemed positive examples and those without user engagement may be deemed negative examples. By contrast, as will be disclosed herein, the social network system 100 incorporates VPT to determine relevance. The content item 122 types of the curves 902A, 902B, 902C, et seq, may correspond to the content item 122 types of the curves 802A, 802B, 802C, et seq.

Beyond impression duration. VPT also enables an estimation of dwell time (e.g., click duration). In an illustrative example, tracking data shows that at t0 a user views content items 122 corresponding to curves 902A, 902B, 902C, et seq. and at t1 the user clicks on a content item 122 corresponding to 902B, then at t2 the user views content items 122 corresponding to curves 902B, 902C, 902D, et seq, (i.e., the user is scrolling down the feed 202). The upper bound of click duration on the content item 122 corresponding to 902B is t2−t1. Dwell time for all clicks can be computed by joining clicks and impressions for each user session and sorting the events by time.

Dwell time derived from tracking data may have some limitations. In various circumstances, dwell time may only provide an upper bound. In other words, dwell time may include not only time a user spends reading clicked content, but also network delay in loading the content, or user taking a break from reading, etc. Further, in various circumstances, dwell time may not work for the last click of a session if the user does not come back to the feed 202 before the session expires (in which case t2 does not exist). Nonetheless, the limitations do not necessarily exist under all or most circumstances, and dwell time may provide an extra signal to measure a significance for most clicks.

Figure 10:
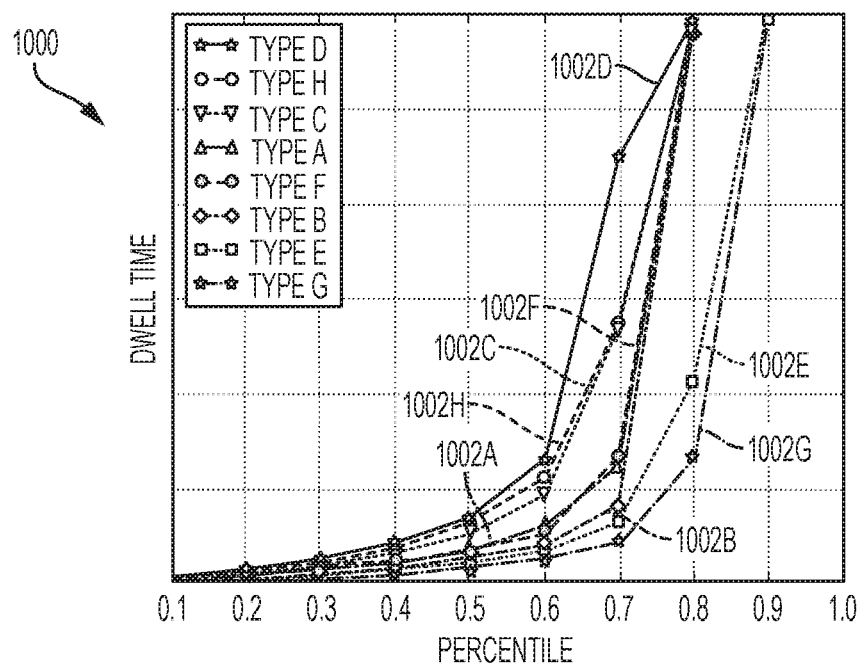
FIG. 10 is a graph for the distribution of dwell time by content item object type, in an illustrative empirical example.

FIG. 10 is a graph 1000 for the distribution of dwell time by content item 122 object type, in an illustrative empirical example. In such an example, dwell time may be capped at a relatively large threshold beyond which less confidence may be had for accuracy. A large spread of dwell time across object types is apparent, and object types that are content-heavy, such as content item 122 types corresponding to curves 1002D and 1002H, show the longest dwell time.

Similar to duration time, dwell time may be utilized for improved relevance determination. For example, very short engagement may be removed from training data. Short engagement may be accidental and hence lead to false positives. Such false positives may particularly be a problem on mobile devices where a user may "fat finger" when trying to scroll through the feed 202. A more general approach may be to assign additional importance to long engagements for certain types of content items 122, such as articles. The amount of time spent reading an article (normalized by its length) may serve as an indicator of quality of the article, and incorporating dwell time may lead to improved relevance determination, as disclosed herein.

In various examples, utilizing of VPT by the social network system 100 incorporates three factors or points of analysis. First, VPT is applied to a feed relevance model under the framework of an examination model, where duration information is utilized in relevance prediction. Second, VPT is utilized by a reranker, namely impression discounting. In such an example, improved accuracy of VPT over server-side tracking may produce improved reranking performance. Finally, a metric for feed relevance, namely engaged feed sessions, is introduced and utilized to explain the role of VPT in metric calculation.

In the context of the feed 202 of the social network system 100, as disclosed herein, a user may engage with a content item 122 in multiple ways. The user may click on the content item 122 to view details (e.g., an article), like or comment on the content item 122, or share the content item 122 to other members of their network. All four types of engagement may be considered interactions, but like, comment and share may be considered viral actions. Viral actions may tend show a stronger signal of relevance. In various examples, when users like/comment/share an update, the action will become visible to their network. Therefore, users may tend to be more careful and act only on content items 122 that are truly relevant to them. Further, each viral action from a user creates a new content item 122 for other users, and thereby increases the number of content items 122 available in the online social networking system 100, improving overall relevance. As a result, in various examples, the feed relevance model aims to optimize for both classes of engagement, with an interaction component optimizing for feed interaction rate, and a viral component optimizing for viral action rate (VAR). As utilized herein, click should be understood as a general term for all feed interactions and click-through rate (CTR) in place of feed interaction rate.

In order to optimize for both CTR and VAR, two logistic regression models $\beta_{click}$ and $\beta_{viral}$ are trained and combined with weight coefficients w with a weight between 0 and 1.

$$\beta = w\beta_{click} + (1-w)\beta_{viral} \qquad (1)$$

The weight w determines how much viral actions are favored over clicks. As will be disclosed herein, in various examples, viral actions may be favored The context of a user and a content item 122 may be based on empirically-determined relationships between characteristics (e.g., profile data 116 and activity data 118) of the user for whom the feed 202 is being generated, characteristics of the content items 122 under consideration, and characteristics of other users of the online social networking system 100 who have interacted or not interacted with the content items 122 under consideration. As such, a contextual relevance score may be determined according to any one or more of a variety of mechanisms known in the art related to relevance and search, including but not limited to principles disclosed in: U.S. Patent Application Publication No. 2016/0034465, "PERSONALIZED SEARCH BASED ON SIMILARITY", filed Nov. 12, 2014; U.S. Patent Application Publication No. 2016/0224561. "CONTENT PROVISION BASED ON USER-PAIR AFFINITY IN A SOCIAL NETWORK", filed Jun. 30, 2015; and U.S. Patent Application Publication No. 2016/0225013, "SOCIAL NETWORK CONTENT ITEM FEDERATION BASED ON ITEM UTILITY VALUE", filed Feb. 27, 2015, all of which are incorporated by reference herein in their entirety.

In an example, the examination model introduces a random variable to denote whether a user has examined or otherwise interacted with a content item 122. In the examination model, a click event depends on both the random variable and context features of the user and content item

122. Let $x_i$ denote the contextual relevance of showing a content item 122 i, and $y_i$ denote a binary variable indicating whether the user clicks on the update: $y_i \in \{0,1\}$. The relevance model predicts the probability $Pr(y_i=1|x_i)$ for each content item 122, i=1, ..., n, and then ranks content items 122 based on $Pr(y_i=1|x_i)$. In reality, however, a click event may not depend only on the context $x_i$, but may also depend on whether the user has actually examined the content item 122 in question. For example, a user may quickly scroll down multiple content items 122 without looking at them closely. In this case, a click event is unlikely to happen even if the update is relevant to the user. Previous studies introduced a binary random variable e where e=1 indicates that user has examined the update, and e=0 indicates that user has not examined the update, and decomposed $Pr(y_i=1|x_i)$ in this manner:

$$Pr(y_i|x_i) = Pr(y_i|x_i,e)Pr(e|x_i). \quad (2)$$

In an example, it is assumed that if a user has not examined content item 122 i, the user cannot click on the content item 122 i or the click cannot be meaningful. Thus, $Pr(y_i=1|x_i, e=0)=0$. Then, $$Pr(y_i=1|x_i) = Pr(y_i=1|x_i, e=1)Pr(e=1|x_i),$$

where $Pr(y_i=1|x_i, e=1)$ is used to represent the relevance of content item 122 i to the user, rather than $Pr(y_i=1|x_i)$. Thus, feed relevance is based on predicted $Pr(y_i=1|x_i, e=1)$. In the social network system 100, logistic regression is utilized to train and predict $Pr(y_i=1|x_i, e=1)$. However, historical data can be seen as a sample from $Pr(y_i=1|x_i)$. Therefore, bias may be due to the difference of $Pr(e=1|x_i)$. If the examination probability were known, the data may be reweighted to remove this bias. However, in certain circumstances, $Pr(e=1|x_i)$ may be unknown. The social network system 100 utilizes VPT to infer $Pr(e=1|x_i)$ and mitigate this bias.

VPT data provides at least partial information about the examination random variable e. In a first approach, training data is filtered by a lower limit on VPT duration. For example, if a content item 122 has not appeared on the user interface 200 or only appeared for a very short period, the user probably has not examined the content item 122 and therefore $Pr(e=1|x_i)$ must be close to 0. In this approach, two values for $Pr(e=1|x_i)$ are considered:

$$Pr(e=1|x_i) = \begin{cases} \in, & d_i < 0.3 \\ \in, & d_i \geq 0.3 \end{cases} \quad (3)$$

where $\in$ is a very small positive constant and $d_i$ is the duration time in seconds in which the content item 122 i was displayed on the user interface 200, in the illustrated example 0.3 seconds (i.e., 300 milliseconds), as described above. Let $p(x_i; \beta)$ be the model to predict $Pr(y_i=1|x_i; e=1)$, where $\beta$ are the coefficients of the model, and $e_i=Pr(e=1|x_i)$. The log-likelihood of this data point $(x_i, y_i)$ is:

$$L(x_i, y_i; \beta) = y_i \log p(x_i; \beta)e_i + (1-y_i)\log[1 - p(x_i; \beta)e_i]$$

$$= y_i \log p(x_i; \beta) + y_i \log e_i + (1-y_i)\log[1 - p(x_i; \beta)e_i]$$

There are three cases which may be considered:

In a first case, if $y_i=1$, $L(x_i, y_i; \beta) = y_i \log p(x_i; \beta) + y_i \log e_i$, where $y_i \log e_i$ is a constant with respect to $\beta$. $y_i \log p(x_i; \beta)$ is the log-likelihood of the logistic regression model for $y_i=1$ without using $e_i$.

In a second case, if $y_i=0$ and $e_i=\in$, then since $\in$ is very small, $L(x_i, y_i; \beta) \approx 0$. This data point may not be relevant to learn $\beta$.

In a third case, if $y_i=0$ and $e_i=1$, then $L(x_i, y_i; \beta) = \log[1-p(x_i; \beta)]$, which is the log-likelihood of the logistic regression model for $y_i=0$ without $e_i$.

From the three cases, it may be concluded that logistic regression may be used to learn $\beta$ by removing the impressions when $y_i=0$ and $e_i=\in$ where $y_i$ is observed from the historical data and $e_i$ is estimated based on viewport tracking data.

The model may be evaluated offline via a replay process. Replay takes a model and runs the model on historical data collected from a random bucket or source, e.g., the member activity and behavior database 114. The replay may utilize clicks and viral actions on matched impressions. Specifically, the replay may utilize content items 122 that were presented at serving time and reorder those content items 122 using the new model under evaluation. Matched impressions are defined as content items 122 that appear at the same position as the content items 122 did at the time those content items 122 were served as part of a feed 202. Measuring engagement on matched impressions may help remove bias from evaluation results induced by the positions 204 in which the content items 122 were placed when served. In an example illustrated herein, training data contains more than fifty (50) million examples, with 75% negatives filtered out by VPT, and testing data contains more than 1.5 million sessions.

Figure 11:
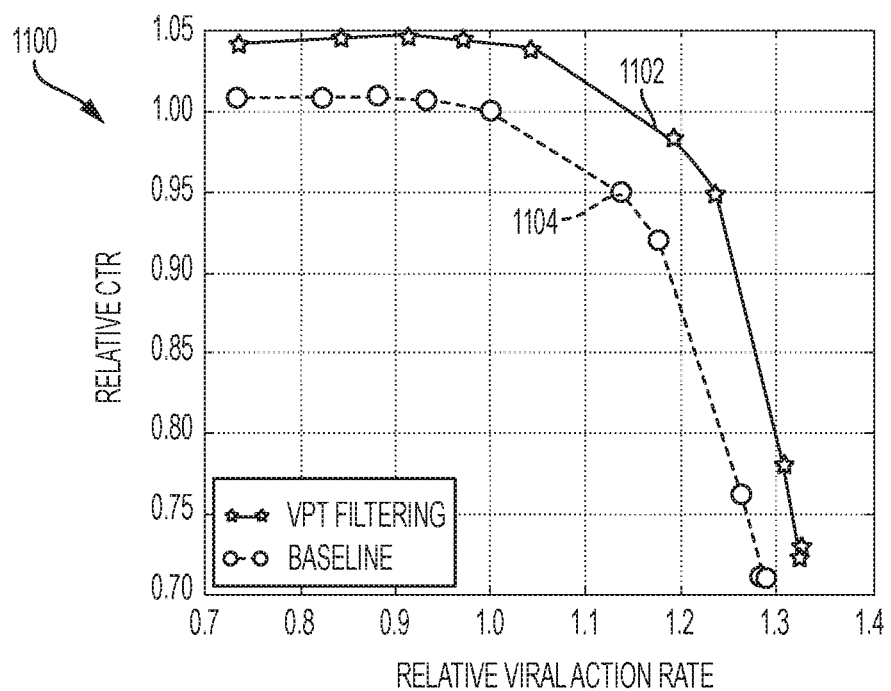
FIG. 11 is a graph of offline replay results for models trained with and without VPT filtering, in an illustrative empirical example.

FIG. 11 is a graph 1100 of offline replay results for models trained with and without VPT filtering, in an illustrative empirical example. The curve 1102 illustrates a model with VPT filtering and the curve 1104 illustrates a model without VPT filtering. The curves 1102, 1104 represent tradeoffs between CTR and VAR (both calculated for precision at 1), where each point on a curve 1102, 1104 represents a different weight w used to combine $\beta_{click}$ and $\beta_{viral}$. The same set of weights $\{1.0, 0.97, 0.95, 0.93, 0.9, 0.8, 0.75, 0.5, 0.1, 0.0\}$ are used for both models, and w=0.9 for the final model utilized by the online social networking system 100. Both CTR and VAR are scaled such that baseline with w=0.9 has CTR and VAR of 1.0. It is noted that the VPT model moves the baseline curve 1104 to the upper right for the curve 1102 (i.e., shows better CTR and VAR for all combining weights). At w=0.9, the VPT model curve 1102 shows 3.9% lift in CTR and 4.3% lift in VAR over the baseline curve 1104.

In the VPT filtering approach, it may be assumed that if duration time of a content item 122 is longer than 0.3 second, $Pr(e=1|x_i)=1$. However, as noted, that assumption may be improved or changed depending on various circumstances. In various cases, 0.3 seconds may be too short for a user to have a close examination on the content item 122. Alternatively, if the duration time is too long, the user may not be looking at the user interface 200 at all. In an example, $Pr(e=1|x_i)=1$ is allowed only if duration time of a content item 122 falls in a certain interval $[a, b]$. In such an example, three values are assigned to $Pr(e=1|x_i)$ based on duration time $d_i$ in seconds:

$$Pr(e=1|x_i) = \begin{cases} \in, & d_i < 0.3 \\ 1, & d_i \in [a, b), \\ \delta, & \text{otherwise} \end{cases} \quad (5)$$

where $0.3 \leq a < b$, and $\in < \delta < 1$. It is noted that if $a=0.3$ and b is infinite, this method is equivalent to VPT filtering.

Figure 12:
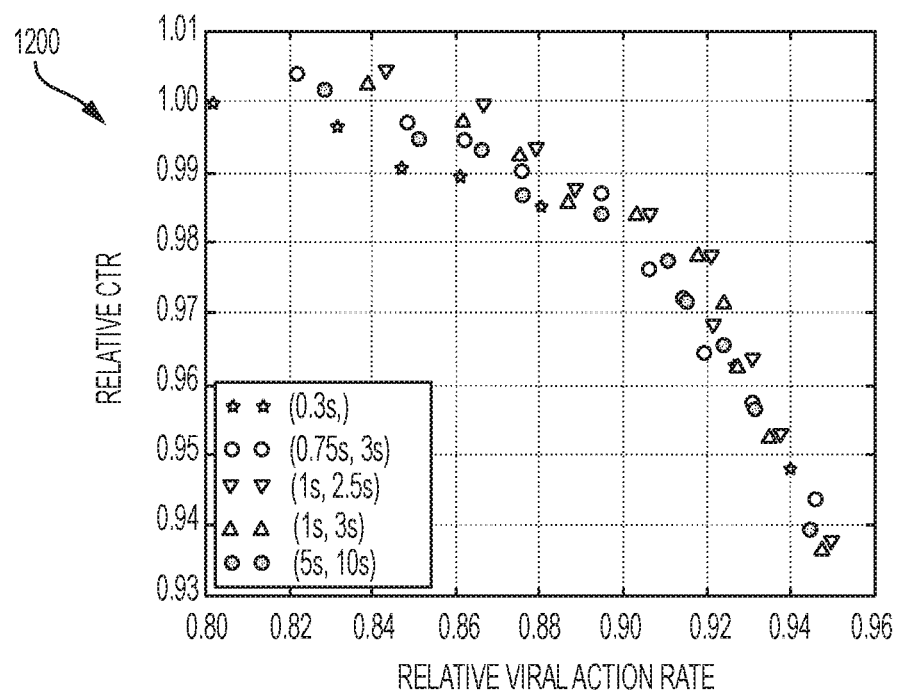
FIG. 12 is a plot of offline replay results for various duration time windows, in illustrative empirical example.

FIG. 12 is a plot 1200 of offline replay results for various duration time windows, in illustrative empirical example. In an example, the windows are windows [a, b], where [0.3) is the VPT filtering approach (baseline). Performance of each model is represented by a tradeoff curve between CTR and VAR, where CTR (VAR) is scaled by dividing the maximum CTR (VAR) of the baseline. The results show that, in the illustrated empirical example, [1 s, 2:5 s] offers the best performance compared to other duration windows. In other words, user feedback of impressions between 1 second to 2.5 seconds are, according to these data, the most effective for model fitting. It is noted an emphasized that the values provided herein may not be applicable in other circumstances and that other implementations of the online social networking system 100 may result in other empirically determined values.

Such results may indicate that, under the testing conditions, duration time of content items 122 is not always positively correlated to the examination probability. A longer duration time may not indicate more accurate user feedback. In various examples, probability of a click may be related to the degree of satisfaction a user achieves by clicking it. For example, if a user is already satisfied by looking at a short portion of an article, the user may not bother to click into the article, which leads to lower observed CTR and more confusing user feedback to the relevance model. Alternatively, if a content item 122 is relevant and the user has not been satisfied by just looking at the impression, they may then click on the content item 122 to view more details. This behavior may be characterized by a relatively short duration time.

In an example, each time a user sees the same content item 122 in the feed 202, the user's probability of clicking on that content item 122 decreases. Table 1 provides various, empirically determined metrics related to this phenomenon from one or more online social network systems.

TABLE 1

Results of A/B tests for VPT filtering. All reported results are statistically significant at the p = 0.05 level, using a z-test.

| Metric | Description | Lift |
| --- | --- | --- |
| feed interactions | #feed interactions per user | 5.2% |
| feed interaction unique users | #users performing feed interactions | 1.4% |
| viral actions | #viral actions per user. | 5.1% |
| viral action unique users | #users performing viral actions. | 2.5% |
| engaged feed sessions | #engaged feed sessions per user. | 1.1% |

TABLE 2

Results of A/B tests for impression discounting with viewport tracking. All reported results are statistically significant at the p = 0.05 level, using a z-test.

| Metric | Lift |
| --- | --- |
| feed interactions | 2.4% |
| feed interaction unique users | 0.7% |
| viral actions | 10.2% |
| viral action unique users | 2.3% |

Adding features that capture the number of past impressions may increase the accuracy of the prediction model. However, in addition to adding features to the model, further penalizing the prediction score of an update based on the number of impressions a user has on an item may improve model performance online through impression discounting.

The score of a content item 122 may be altered in the following fashion, where v is the number of times a user has viewed the content item 122:

$$\text{score} = p(\text{click}|u) \cdot \exp(-\Sigma \lambda \cdot v). \quad (6)$$

As noted herein, content items 122 may, in various examples, operate as actor-verb-object triples, for instance, member Bob (actor) shared (verb) article 1234 (object). In an example, impression discounting may be based on the number of times a user has viewed a given content item 122 or may be based on the number of times a user has seen one or more of the actor, the verb, or the object. Substituting VPT impressions for server side impression discounting, as described herein, may mitigate spurious or repetitive impressions.

User activities on the feed 202 may be timestamped and divided into sessions, where, e.g., thirty (30) minutes of inactivity from user defines a session breakpoint. An engaged feed session may be a session in which a user has either scrolled down the feed 202 to view at least ten (10) content items 122, or engaged with (clicked, liked, commented, shared, etc.) at least one content item 122. If user intent is not on the feed 202, e.g., because the user is intending to engage with another aspect of the online social networking system 100 and accessing the feed 202 was merely incidental that accessing of the feed 202 may be excluded from feed metrics. The criteria above may differentiate feed users from those who are passing through the feed 202 for another aspect of the online social networking system 100. The definition sets a minimum bar to determine whether a user has received some value from the feed 202, either by passively scrolling through and reading content items 122, or by actively clicking into the content items 122.

Based on the definition, two pieces of information may be utilized to count engaged feed sessions: (1) User engagements (clicks, likes, comments, shares, etc.). (2) User scrolling down the feed 202 to view at least k content items 122, which may be impractical or impossible to track from server side. VPT, however, is able to track impressions from client side. Thus, the number of content items 122 a user has viewed may be determined by aggregating the number of VPT events. Engaged feed sessions as may be a metric for feed relevance.

Figure 13:
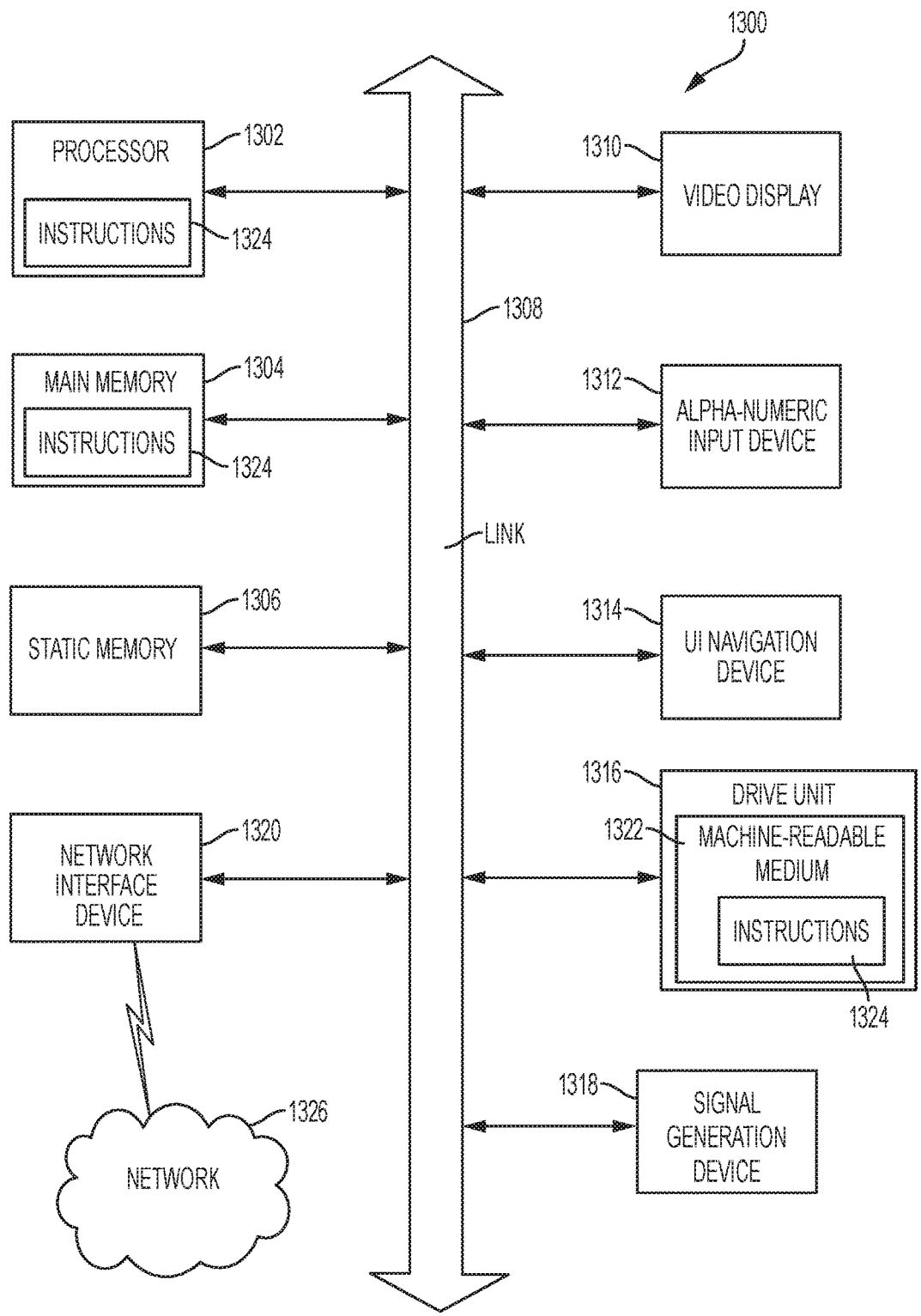
FIG. 13 is a block diagram illustrating components of a machine able to read instructions from a machine-readable medium.

FIG. 13 is a block diagram illustrating components of a machine 1300, according to some example examples, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system and within which instructions 1324 (e.g., software) for causing the machine 1300 to perform any one or more of the methodologies discussed herein may be executed. In alternative examples, the machine 1300 operates as a standalone device or may be connected (e.g., networked) to other machines. In a networked deployment, the machine 1300 may operate in the capacity of a server machine or a client machine in a server-client network environment, or as a peer machine in a peer-to-peer (or distributed) network environment. The machine 1300 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include a collection of machines that individually or jointly execute the instructions 1324 to perform any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The machine 1300 may further include a graphics display 1310 (e.g., a plasma display panel (PDP), a light emitting diode (LED) display, a liquid crystal display (LCD), a projector, or a cathode ray tube (CRT)). The machine 1300 may also include an alphanumeric input device 1312 (e.g., a keyboard), a cursor control device 1314 (e.g., a mouse, a touchpad, a trackball, a joystick, a motion sensor, or other pointing instrument), a storage unit 1316, a signal generation device 1318 (e.g., a speaker), and a network interface device 1320.

The storage unit 1316 includes a machine-readable medium 1322 on which is stored the instructions 1324 (e.g., software) embodying any one or more of the methodologies or functions described herein. The instructions 1324 may also reside, completely or at least partially, within the main memory 1304, within the processor 1302 (e.g., within the processor's cache memory), or both, during execution thereof by the machine 1300. Accordingly, the main memory 1304 and the processor 1302 may be considered as machine-readable media. The instructions 1324 may be transmitted or received over a network 1326 via the network interface device 1320.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing or carrying instructions (e.g., software) for execution by a machine (e.g., machine 1300), such that the instructions, when executed by one or more processors of the machine (e.g., processor 1302), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium including a signal or a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits." "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A processor implemented method, comprising:
   receiving a request to generate a feed for an online social networking system, the feed to be displayed on a user interface associated with a member of the online social networking system;
   obtaining, from an activity database of the online social networking system, activity data of content items of the online social networking system, the activity data including:
      duration data indicative of a duration in which at least some of the content items has previously been displayed on other feeds of members of the online social networking system, the duration data provided, at least in part, to the activity database by client devices on which the feeds were displayed, wherein the duration data comprises a first time at which a first percentage of associated content item was displayed on a prior feed and a second time at which a second percentage of the associated content item was no longer displayed on the prior feed; and
      interactions with the content items by the members;
   for each of the content items, determining a probability score of the member to interact with the content item by applying a logistic regression model to the duration data and the interactions to determine, at least in part, a probability score of the member to interact with the content item;
   generating the feed with at least some of the content items having an order based on the probability score for each of the at least some content items; and
   transmitting via a network interface, the feed as generated to a client device associated with the member.

2. The method of claim 1, wherein determining, for each of the content items, the probability score is further based on a contextual relevance score computed based, at least in part, on characteristics of the member and the activity data of the content item.

3. The method of claim 2, wherein at least one of the content items has an associated actor-verb-object triplet based on content of the content item, and wherein determining, for each of the content items, the probability score is further based on a reducing the probability score based on a number of times the member has viewed, on a feed, content items having at least one similar actor, verb, or object as the content item.

4. The method of claim 1, wherein the first and second percentages are both fifty percent.

5. The method of claim 4, wherein determining the probability score is further based, at least in part, on the duration exceeding a predetermined minimum time.

6. The method of claim 5, wherein determining the probability score is further based, at least in part, on the duration not exceeding a predetermined maximum time.

7. A non-transitory computer readable medium comprising instructions which, when implemented by a processor, cause the processor to perform operations comprising:
receive a request to generate a feed for an online social networking system, the feed to be displayed on a user interface associated with a member of the online social networking system;
obtain from an activity database of the online social networking system, activity data of content items of the online social networking system, the activity data including:
duration data indicative of a duration in which at least some of the content items has previously been displayed on other feeds of members of the online social networking system, the duration data provided, at least in part, to the activity database by client devices on which the feeds were displayed, wherein the duration data comprises a first time at which a first percentage of associated content item was displayed on a prior feed and a second time at which a second percentage of the associated content item was no longer displayed on the prior feed; and
interactions with the content items by the members;
for each of the content items, determine a probability score of the member to interact with the content item by applying a logistic regression model to the duration data and the interactions to determine, at least in part, a probability score of the member to interact with the content item;
generate the feed with at least some of the content items having an order based on the probability score for each of the at least some content items; and
transmit, via a network interface, the feed as generated to a client device associated with the member.

8. The computer readable medium of claim 7, wherein the instructions further cause the processor to determine, for each of the content items, the probability score further based on a contextual relevance score computed based, at least in part, on characteristics of the member and the activity data of the content item.

9. The computer readable medium of claim 8, wherein at least one of the content items has an associated actor-verb-object triplet based on content of the content item, and wherein the instructions further cause the processor to determine, for each of the content items, the probability score further based on a reducing the probability score based on a number of times the member has viewed, on a feed, content items having at least one similar actor, verb, or object as the content item.

10. The computer readable medium of claim 7, wherein the first and second percentages are both fifty percent.

11. The computer readable medium of claim 10, wherein the instructions further cause the processor to determine the probability score further based, at least in part, on the duration exceeding a predetermined minimum time.

12. The computer readable medium of claim 11, wherein the instructions further cause the processor to determine the probability score further based, at least in part, on the duration not exceeding a predetermined maximum time.

13. A system, comprising:
a non-transitory computer readable medium comprising instructions which, when implemented by a processor, cause the processor to perform operations comprising:
receive a request to generate a feed for an online social networking system, the feed to be displayed on a user interface associated with a member of the online social networking system;
obtain from an activity database of the online social networking system, activity data of content items of the online social networking system, the activity data including:
duration data indicative of a duration in which at least some of the content items has previously been displayed on other feeds of members of the online social networking system, the duration data provided, at least in part, to the activity database by client devices on which the feeds were displayed, wherein the duration data comprises a first time at which a first percentage of associated content item was displayed on a prior feed and a second time at which a second percentage of the associated content item was no longer displayed on the prior feed; and
interactions with the content items by the members;
for each of the content items, determine a probability score of the member to interact with the content item by applying a logistic regression model to the duration data and the interactions to determine, at least in part, a probability score of the member to interact with the content item;
generate the feed with at least some of the content items having an order based on he probability score for each of the at least some content items; and
transmit, via a network interface, the feed as generated to a client device associated with the member.

14. The system of claim 13, wherein the instructions further cause the processor to determine, for each of the content items, the probability score further based on a contextual relevance score computed based, at least in part, on characteristics of the member and the activity data of the content item.

15. The system of claim 14, wherein at least one of the content items has an associated actor-verb-object triplet based on content of the content item, and wherein the instructions further cause the processor to determine, for each of the content items, the probability score further based on a reducing the probability score based on a number of times the member has viewed, on a feed, content items having at least one similar actor, verb, or object as the content item.

16. The system of claim 13, wherein the first and second percentages are both fifty percent.

17. The system of claim 16, wherein the instructions further cause the processor to determine the probability score further based, at least in part, on the duration exceeding a predetermined minimum time.

18. The system of claim 17, wherein the instructions further cause the processor to determine the probability score further based, at least in part, on the duration not exceeding a predetermined maximum time.

19. The system of claim 13, further comprising the processor and the network interface.

* * * * *

UNITED STATES PATENT AND TRADEMARK OFFICE
CERTIFICATE OF CORRECTION

PATENT NO. : 10,372,740 B2  
APPLICATION NO. : 15/454136  
DATED : August 6, 2019  
INVENTOR(S) : Chang et al.

Page 1 of 1

It is certified that error appears in the above-identified patent and that said Letters Patent is hereby corrected as shown below:

In the Claims

In Column 22, Line 30, in Claim 13, delete "he" and insert --the-- therefor

Signed and Sealed this  
Twenty-fourth Day of March, 2020

Andrei Iancu  
*Director of the United States Patent and Trademark Office*